(12) United States Patent
Jia et al.

(10) Patent No.: US 12,498,284 B2
(45) Date of Patent: Dec. 16, 2025

(54) DYNAMIC-BALANCE TEST METHOD AND APPARATUS FOR RIGID ROTOR, DEVICE, AND MEDIUM

(71) Applicant: CSG POWER GENERATION CO., LTD. MAINTENANCE AND TEST COMPANY, Guangdong (CN)

(72) Inventors: Yalin Jia, Guangzhou (CN); Qing Li, Guangzhou (CN); Yu Gong, Guangzhou (CN); Haixia Yang, Guangzhou (CN); Dongyang Hu, Guangzhou (CN); Xiangdong Liu, Guangzhou (CN); Yakang Zhao, Guangzhou (CN); Peng Ling, Guangzhou (CN); Dejiang Hu, Guangzhou (CN); Yuxi Wu, Guangzhou (CN); Ying Wang, Guangzhou (CN); Yu Peng, Guangzhou (CN); Yuanfei Chen, Guangzhou (CN); Liangliang Nie, Guangzhou (CN); Minghao Huang, Guangzhou (CN); Jun Jiang, Guangzhou (CN); Wenhan Huang, Guangzhou (CN); Chang Xiao, Guangzhou (CN); Shidi Tao, Guangzhou (CN); Xubin Chen, Guangzhou (CN); Yanhong Liu, Guangzhou (CN); Na Zhang, Guangzhou (CN); Yifeng Huang, Guangzhou (CN)

(73) Assignee: CSG POWER GENERATION CO., LTD. MAINTENANCE AND TEST COMPANY, Guangzhou (CN)

( * ) Notice: Subject to any disclaimer, the term of this patent is extended or adjusted under 35 U.S.C. 154(b) by 0 days.

(21) Appl. No.: 18/996,391

(22) PCT Filed: May 30, 2023

(86) PCT No.: PCT/CN2023/097039
§ 371 (c)(1),
(2) Date: Jan. 17, 2025

(87) PCT Pub. No.: WO2024/113732
PCT Pub. Date: Jun. 6, 2024

(65) Prior Publication Data
US 2025/0258055 A1      Aug. 14, 2025

(30) Foreign Application Priority Data

Dec. 1, 2022      (CN) .......................... 202211523996.5

(51) Int. Cl.
*G01M 1/32* (2006.01)
*G01M 1/22* (2006.01)

(52) U.S. Cl.
CPC ................ *G01M 1/32* (2013.01); *G01M 1/22* (2013.01)

(58) Field of Classification Search
CPC ................................. G01M 1/22; G01M 1/32
See application file for complete search history.

(56) References Cited

U.S. PATENT DOCUMENTS

| | | |
|---|---|---|
| 4,098,127 A | 7/1978 | Shiga et al. |
| 4,489,606 A | 12/1984 | Shiohata et al. |

(Continued)

FOREIGN PATENT DOCUMENTS

| | | |
|---|---|---|
| CN | 101964565 A | 2/2011 |
| CN | 102425561 B | 4/2012 |

(Continued)

OTHER PUBLICATIONS

International Search Report and Written Opinion for corresponding PCT/CN2023/097039 mailed on Sep. 11, 2023.

(Continued)

*Primary Examiner* — Natalie Huls

(74) *Attorney, Agent, or Firm* — Sandberg Phoenix & von Gontard, PC

(57) ABSTRACT

A dynamic-balance test method for a rigid rotor includes: acquiring a counterweight influence coefficient library, initial vibration swing data and an initial vibration vector; determining an initial test weight mass and an initial test weight phase according to the initial vibration swing data and the counterweight influence coefficient library, and triggering a speed increase test according to the initial test weight mass and the initial test weight phase to obtain a target vibration vector; determining a target configuration influence coefficient according to the initial vibration vector, the target vibration vector and the initial test weight mass; calculating a residual vibration swing value; and determining a target test weight adjustment scheme according to the residual vibration swing value, a rotor operation vibration standard, a target test weight mass and a target test weight phase.

12 Claims, 5 Drawing Sheets

(56) References Cited

U.S. PATENT DOCUMENTS

| | | |
|---|---|---|
| 2002/0184946 A1 | 12/2002 | Wolf et al. |
| 2009/0266160 A1 | 10/2009 | Jeffrey et al. |
| 2018/0142676 A1 | 5/2018 | Pedersen |
| 2019/0242774 A1* | 8/2019 | Trukenmueller ....... G01M 1/22 |
| 2022/0119095 A1 | 4/2022 | Tsang et al. |

FOREIGN PATENT DOCUMENTS

| | | | | |
|---|---|---|---|---|
| CN | 104568313 A | | 4/2015 | |
| CN | 105890843 A | | 8/2016 | |
| CN | 109632188 A | * | 4/2019 | ............. G01M 1/16 |
| CN | 109855801 A | | 6/2019 | |
| CN | 110646141 A | * | 1/2020 | ............. G01M 1/32 |
| CN | 113806887 A | * | 12/2021 | ............. G06F 30/17 |
| CN | 114112193 A | | 3/2022 | |
| CN | 114139428 A | | 3/2022 | |
| CN | 114778004 A | * | 7/2022 | ............. G01M 1/32 |
| CN | 115541112 A | | 12/2022 | |
| JP | 2012073122 A | | 4/2012 | |
| JP | 2012088058 A | | 5/2012 | |

OTHER PUBLICATIONS

First Office Action of Chinese prior application 202211523996.5, mailed Jan. 9, 2023.

Second Office Action of Chinese prior application 202211523996.5, mailed Feb. 15, 2023.

GB/T 18482-2010. (2010). Specification for start-up test of reversible pumped-storage units [可逆式抽水 蓄能机组启动 试运行规程 . National Standard of the People's Republic of China. Issued Dec. 23, 2010, Implemented May 1, 2011.

Notification to Grant Patent Right for Invention of Chinese prior application 202211523996.5, mailed Feb. 22, 2023.

* cited by examiner

DYNAMIC-BALANCE TEST METHOD AND APPARATUS FOR RIGID ROTOR, DEVICE, AND MEDIUM

CROSS-REFERENCE TO RELATED APPLICATIONS

This is a national stage application filed under 37 U.S.C. 371 based on International Patent Application No. PCT/CN2023/097039, filed May 30, 2023, which claims priority to Chinese Patent Application No. 202211523996.5 filed with the China National Intellectual Property Administration (CNIPA) on Dec. 1, 2022, the content of which (text, claims, and drawings) is incorporated herein by reference in its entirety.

TECHNICAL FIELD

The present application relates to the technical field of engines, for example, a dynamic-balance test method and apparatus for a rigid rotor, a device and a medium.

BACKGROUND

A unit of an energy storage power plant has the characteristics of a high rotational speed, frequent start and stop, relatively large power adjustment and a complex transition process. After long-term operation, the problems such as manufacturing and installation processes and heat distortion may cause rotor imbalance. Moreover, due to the problem of a relatively large and complex force on magnetic poles, some magnetic poles may be pulled out for inspection or replacement during unit maintenance, and a certain difference between weights of new and old magnetic poles may also cause rotor imbalance. Therefore, after the unit is put into operation, experiences heavy maintenance and performs other work that may cause rotor imbalance, to ensure operational safety, whether the horizontal vibration and swing degree of a guide bearing of the unit exceeds a standard needs to be confirmed. If the horizontal vibration and swing degree of the guide bearing of the unit exceeds the standard, a dynamic-balance test of a rotor needs to be performed to eliminate or weaken the imbalance condition through a rotor counterweight.

At present, dynamic-balance calculation in the dynamic-balance test is mainly performed in a manner of manual calculation at a single measuring point, resulting in the following problems: a calculation process is cumbersome and is not standardized, test efficiency is relatively low, a calculation error may exist due to the limitation on a technical level of a testing personnel, and historical test data cannot be effectively used to guide the test due to the limitation on a reference degree to the historical test data.

SUMMARY

The present application provides a dynamic-balance test method and apparatus for a rigid rotor, a device and a medium to solve the problems of low test efficiency, a calculation error in manual calculation and insufficient use of historical test data.

According to an aspect of the present application, a dynamic-balance test method for a rigid rotor is provided. The dynamic-balance test method for a rigid rotor includes the steps described below.

A counterweight influence coefficient library, initial vibration swing data during a first speed increase test after maintenance of a current pumped energy storage motor and an initial vibration vector during the first speed increase test after the maintenance of the current pumped energy storage motor are acquired.

An initial test weight mass and an initial test weight phase are determined according to the initial vibration swing data and the counterweight influence coefficient library, and a speed increase test is triggered according to the initial test weight mass and the initial test weight phase to obtain a target vibration vector.

A target configuration influence coefficient is determined according to the initial vibration vector, the target vibration vector and the initial test weight mass.

A target test weight mass and a target test weight phase are determined according to the target configuration influence coefficient and the initial vibration vector, and a residual vibration swing value is calculated according to the target configuration influence coefficient, the initial vibration vector, the target test weight mass and the target test weight phase.

A target test weight adjustment scheme is determined according to the residual vibration swing value, a rotor operation vibration standard, the target test weight mass and the target test weight phase.

According to another aspect of the present application, a dynamic-balance test apparatus for a rigid rotor is provided. The dynamic-balance test apparatus for a rigid rotor includes a first data acquisition module, a second data acquisition module, a target configuration influence coefficient determination module, a residual vibration swing value calculation module and a target test weight adjustment scheme determination module.

The first data acquisition module is configured to acquire a counterweight influence coefficient library, initial vibration swing data during a first speed increase test after maintenance of a current pumped energy storage motor and an initial vibration vector during the first speed increase test after the maintenance of the current pumped energy storage motor.

The second data acquisition module is configured to determine an initial test weight mass and an initial test weight phase according to the initial vibration swing data and the counterweight influence coefficient library and trigger a speed increase test according to the initial test weight mass and the initial test weight phase to obtain a target vibration vector.

The target configuration influence coefficient determination module is configured to determine a target configuration influence coefficient according to the initial vibration vector, the target vibration vector and the initial test weight mass.

The residual vibration swing value calculation module is configured to determine a target test weight mass and a target test weight phase according to the target configuration influence coefficient and the initial vibration vector and calculate a residual vibration swing value according to the target configuration influence coefficient, the initial vibration vector, the target test weight mass and the target test weight phase.

The target test weight adjustment scheme determination module is configured to determine a target test weight adjustment scheme according to the residual vibration swing value, a rotor operation vibration standard, the target test weight mass and the target test weight phase.

According to another aspect of the present application, an electronic device is provided. The electronic device includes at least one processor and a memory communicatively connected to the at least one processor.

The memory stores a computer program executable by the at least one processor to enable the at least one processor to perform the dynamic-balance test method for a rigid rotor according to any embodiment of the present application.

According to another aspect of the present application, a computer-readable storage medium is provided. The computer-readable storage medium stores computer instructions which, when executed by a processor, are configured to perform the dynamic-balance test method for a rigid rotor according to any embodiment of the present application.

BRIEF DESCRIPTION OF DRAWINGS

Drawings used in the description of the embodiments are briefly described below. The drawings described below illustrate part of the embodiments of the present application, and those of ordinary skill in the art can obtain other drawings based on these drawings on the premise that no creative work is done.

DETAILED DESCRIPTION

For a better understanding of solutions of the present application by those skilled in the art, technical solutions in embodiments of the present application are described clearly and completely hereinafter in conjunction with the drawings in the embodiments of the present application. Apparently, the embodiments described hereinafter are part, not all, of embodiments of the present application. Based on the embodiments of the present application, all other embodiments obtained by those of ordinary skill in the art without creative work are within the scope of the present application.

It is to be noted that the terms "initial", "target" and the like in the description, claims and drawings of the present application are used for distinguishing between similar objects and are not necessarily used for describing a particular order or sequence. It is to be understood that data used in this manner are interchangeable where appropriate so that the embodiments of the present application described herein can be implemented in an order not illustrated or described herein. Additionally, terms "include" and "have" and any variations thereof are intended to encompass a non-exclusive inclusion. For example, a process, method, system, product, or device that includes a series of steps or units may include other steps or units that are not expressly listed or are inherent to such process, method, product, or device.

Embodiment One

Figure 1:
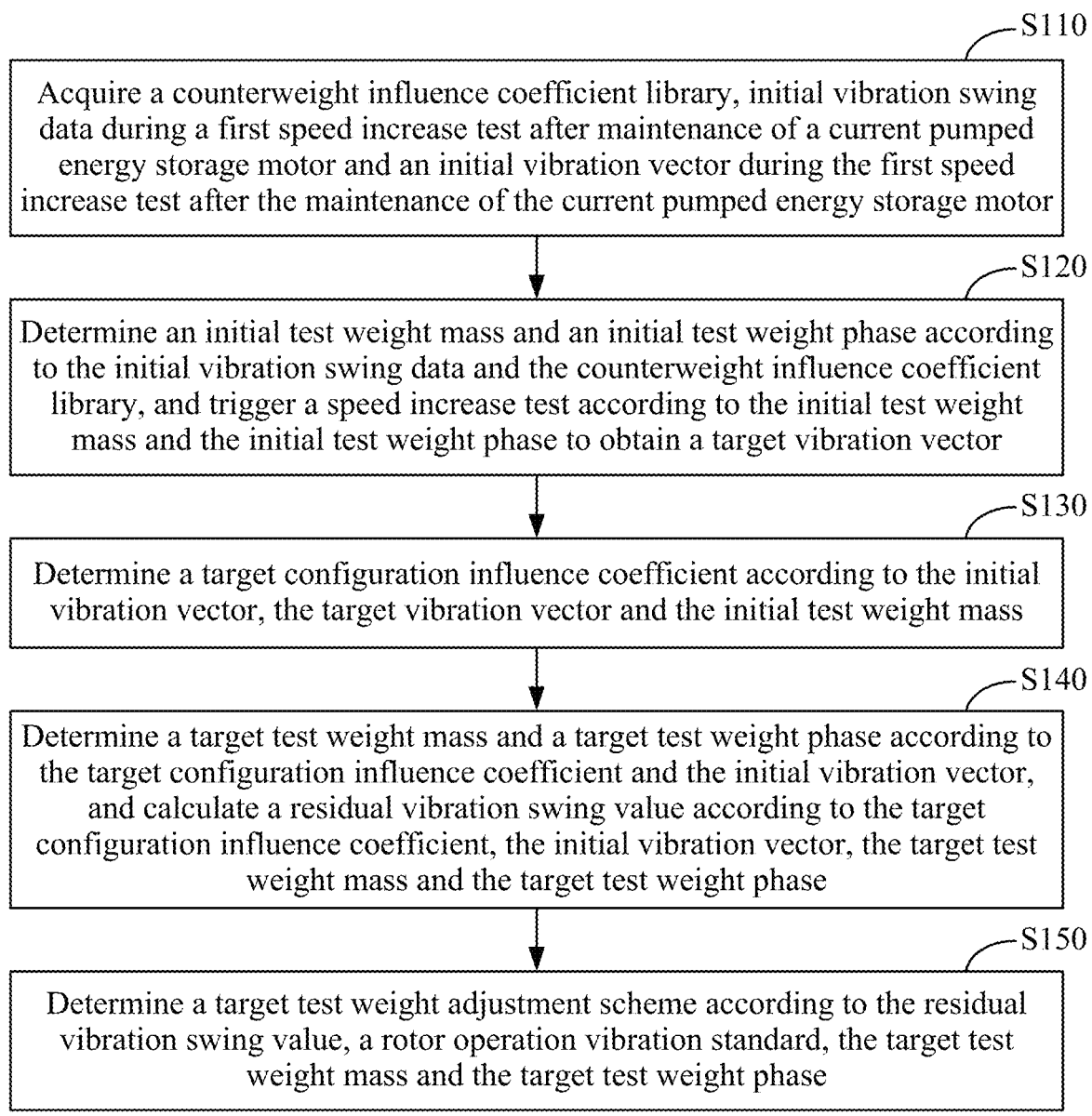
FIG. 1 is a flowchart of a dynamic-balance test method for a rigid rotor according to embodiment one of the present application.

FIG. 1 is a flowchart of a dynamic-balance test method for a rigid rotor according to embodiment one of the present application. This embodiment may be applied to the case of performing an efficient dynamic-balance test for a rigid rotor. The method may be performed by a dynamic-balance test apparatus for a rigid rotor. The dynamic-balance test apparatus for a rigid rotor may be implemented in a form of hardware and/or software and may be configured in an electronic device. The electronic device may be a computer device or a server device. As shown in FIG. 1, the method includes S110 to S150.

In S110, a counterweight influence coefficient library, initial vibration swing data during a first speed increase test after maintenance of a current pumped energy storage motor and an initial vibration vector during the first speed increase test after the maintenance of the current pumped energy storage motor are acquired.

The counterweight influence coefficient library may be a database that records counterweight influence coefficients of the current pumped energy storage motor in all previous historical dynamic-balance tests. The counterweight influence coefficients in the counterweight influence coefficient library may include a counterweight influence coefficient used when an upper portion of the pumped energy storage motor is counterweighted and a counterweight influence coefficient used when a lower portion of the pumped energy storage motor is counterweighted. The upper portion of the motor and the lower portion of the motor may be defined in advance. Generally, a portion above a horizontal plane where a main shaft of the motor is located is defined as the upper portion of the motor, and a portion below the horizontal plane where the main shaft of the motor is located is defined as the lower portion of the motor. The initial vibration swing data may be vibration swing data acquired during the first speed increase test after the maintenance of the current pumped energy storage motor. The initial vibration vector may be a vibration vector of the current pumped energy storage motor determined according to the initial vibration swing data. The speed increase test may be used for increasing a rotational speed of the motor according to a preset speed increase level. For example, the preset speed increase level of the speed increase test may include 25%, 50%, 75% and 100% of a rated rotational speed.

In the embodiment of the present application, counterweight influence coefficients used when the current pumped energy storage motor is counterweighted at different positions can be determined according to test data of the current pumped energy storage motor in the historical dynamic-balance tests to obtain the counterweight influence coefficient library, test data during the first speed increase test after the maintenance of the current pumped energy storage motor can be acquired, the initial vibration swing data can be determined according to the test data during the first speed increase test after the maintenance of the current pumped energy storage motor, and data parsing and vector synthesis processing are performed on the initial vibration swing data to obtain the initial vibration vector.

In S120, an initial test weight mass and an initial test weight phase are determined according to the initial vibration swing data and the counterweight influence coefficient library, and a speed increase test is triggered according to the initial test weight mass and the initial test weight phase to obtain a target vibration vector.

The initial test weight mass may be a pre-calculated mass of a test weight block configured for the current pumped energy storage motor during a second speed increase test after the maintenance of the current pumped energy storage motor. The initial test weight phase may be used for characterizing a position of the test weight block installed during the second speed increase test after the maintenance of the current pumped energy storage motor. The target vibration vector may be a vibration vector determined according to test data during the second speed increase test after the maintenance of the current pumped energy storage motor.

In the embodiment of the present application, the initial vibration swing data can be parsed to determine a vibration amplitude of the current pumped energy storage motor, the initial test weight mass and the initial test weight phase can be determined according to the vibration amplitude of the current pumped energy storage motor and the counterweight influence coefficient library, the test weight block can be installed at the current pumped energy storage motor and the speed increase test can be triggered according to the initial test weight mass and the initial test weight phase, and data parsing and vector synthesis processing can be performed on vibration swing data acquired during the second speed increase test after the maintenance to obtain the target vibration vector.

In S130, a target configuration influence coefficient is determined according to the initial vibration vector, the target vibration vector and the initial test weight mass.

The target configuration influence coefficient may be used for characterizing an influence coefficient of a configured test weight block with a target test weight mass on the current pumped energy storage motor during the second speed increase test after the maintenance of the current pumped energy storage motor.

In the embodiment of the present application, an influence value of the added test weight block with the initial test weight mass on the vibration vector can be calculated according to the target vibration vector and the initial vibration vector, and a ratio of the influence value to the initial test weight mass can be used as the target configuration influence coefficient.

In S140, a target test weight mass and a target test weight phase are determined according to the target configuration influence coefficient and the initial vibration vector, and a residual vibration swing value is calculated according to the target configuration influence coefficient, the initial vibration vector, the target test weight mass and the target test weight phase.

The target test weight mass may be a mass of a test weight block determined according to the initial vibration swing data and the counterweight influence coefficient library and configured at a selected test point in the current pumped energy storage motor for eliminating vibration swing that exists in the first speed increase test after the maintenance of the current pumped energy storage motor. Optionally, the test point may include an upper guide, a lower guide, an upper rack and a lower rack. The selected test point may be self-selected according to a requirement for eliminating the vibration swing. For example, the selected test point may include an upper rack or a lower rack. The target test weight phase may be used for determining an installation position of the test weight block with the target test weight mass at the current pumped energy storage motor. The residual vibration swing value may be data that characterizes a vibration swing situation occurred when the speed increase test is performed after the test weight block with the target test weight mass is installed at the current pumped energy storage motor.

In the embodiment of the present application, an optimal test point for eliminating the vibration swing is determined according to the initial vibration swing data, the test point is used as the selected test point, the target test weight mass and the target test weight phase of the counterweight block that needs to be installed at the selected test point are determined according to the target configuration influence coefficient and the initial vibration vector, and the residual vibration swing value is calculated according to the target configuration influence coefficient, the initial vibration vector, the target test weight mass and the target test weight phase.

In S150, a target test weight adjustment scheme is determined according to the residual vibration swing value, a rotor operation vibration standard, the target test weight mass and the target test weight phase.

The rotor operation vibration standard may be an allowable vibration standard for the start-up and operation of the pumped energy storage motor. The target test weight adjustment scheme may be a counterweight scheme used when the residual vibration swing value of the current pumped energy storage motor meets the rotor operation vibration standard and includes a counterweight mass and a counterweight phase.

In the embodiment of the present application, if the residual vibration swing value meets the rotor operation vibration standard, the target test weight mass and the target test weight phase that match with the residual vibration swing value are used as the target test weight adjustment scheme. If the residual vibration swing value does not meet the rotor operation vibration standard, a speed increase test is performed again after the target test weight mass and the target test weight phase are updated until the target test weight mass and the target test weight phase that match the residual oscillation value that meet the rotor operation vibration standard are determined to obtain the target test weight adjustment scheme.

In the technical solution of the embodiment of the present application, the counterweight influence coefficient library, the initial vibration swing data during the first speed increase test after the maintenance of the current pumped energy storage motor and the initial vibration vector during the first speed increase test after the maintenance of the current pumped energy storage motor are acquired; the initial test weight mass and the initial test weight phase are determined according to the initial vibration swing data and the counterweight influence coefficient library, and the speed increase test is triggered according to the initial test weight mass and the initial test weight phase to obtain the target vibration vector; the target configuration influence coefficient is determined according to the initial vibration vector, the target vibration vector and the initial test weight mass; the target test weight mass and the target test weight phase are determined according to the target configuration influence coefficient and the initial vibration vector, and the residual vibration swing value is calculated according to the target configuration influence coefficient, the initial vibration vector, the target test weight mass and the target test weight phase; the target test weight adjustment scheme is determined according to the residual vibration swing value, the rotor operation vibration standard, the target test weight mass and the target test weight phase. The counterweight influence coefficient library in this solution can fully reflect a counterweight influence situation of the current pumped energy storage motor in historical speed increase tests. According to the counterweight influence coefficient library, the guidance of the historical speed increase tests to the subsequent dynamic-balance test can be implemented, and historical test data can be effectively used. Moreover, this solution does not need manual data calculation, thereby avoiding an error caused by the manual calculation. Through the test method of this solution, a test process can be standardized, and a final test weight scheme is not determined through a complex calculation process with vector graphics, thereby improving test efficiency, solving the problems of low test efficiency, a calculation error in manual calculation and insufficient use of historical test data existing in a dynamic-balance test for a rigid rotor in the related art, improving the test efficiency, avoiding the error caused by the manual calculation and fully using the historical test data to guide the test.

Embodiment Two

Figure 2:
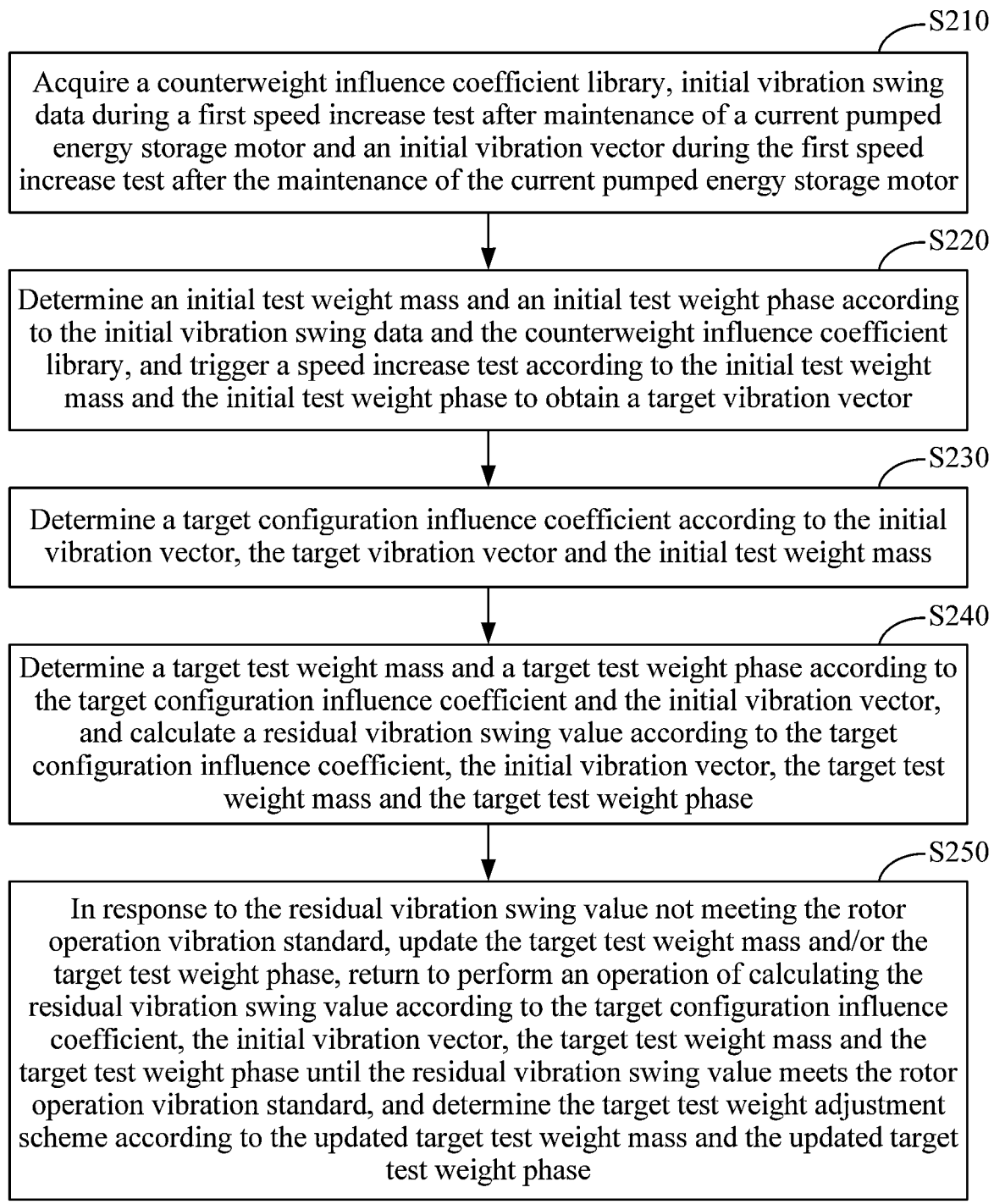
FIG. 2 is a flowchart of a dynamic-balance test method for a rigid rotor according to embodiment two of the present application.

FIG. 2 is a flowchart of a dynamic-balance test method for a rigid rotor according to embodiment two of the present application. This embodiment is concretized on the basis of the preceding embodiment and provides an optional embodiment for determining the target test weight adjustment scheme according to the residual vibration swing value, the rotor operation vibration standard, the target test weight mass and the target test weight phase. As shown in FIG. 2, the method includes S210 to S250.

In S210, a counterweight influence coefficient library, initial vibration swing data during a first speed increase test after maintenance of a current pumped energy storage motor and an initial vibration vector during the first speed increase test after the maintenance of the current pumped energy storage motor are acquired.

In S220, an initial test weight mass and an initial test weight phase are determined according to the initial vibration swing data and the counterweight influence coefficient library, and a speed increase test is triggered according to the initial test weight mass and the initial test weight phase to obtain a target vibration vector.

In an optional embodiment of the present application, determining the initial test weight mass according to the initial vibration swing data and the counterweight influence coefficient library may include: determining a type of a to-be-adjusted rack according to the initial vibration swing data; in response to the type of the to-be-adjusted rack being an adjustment type of an upper rack, determining an initial test weight mass of the upper rack according to a horizontal vibration amplitude of the upper rack in the initial vibration swing data and the counterweight influence coefficient library; or in response to the type of the to-be-adjusted rack being an adjustment type of a lower rack, determining an initial test weight mass of the lower rack according to a horizontal vibration amplitude of the lower rack in the initial vibration swing data and the counterweight influence coefficient library.

The type of the to-be-adjusted rack may be a type of a rack that needs counterweight adjustment. The adjustment type of the upper rack may be used for characterizing that the type of the rack that needs the counterweight adjustment is an upper rack. The adjustment type of the lower rack may be used for characterizing that the type of the rack that needs the counterweight adjustment is a lower rack. The horizontal vibration amplitude of the upper rack may be a vibration amplitude of the upper rack in a horizontal direction. The horizontal vibration amplitude of the lower rack may be a vibration amplitude of the lower rack in the horizontal direction.

In the embodiment of the present application, data parsing can be performed on the initial vibration swing data to acquire the horizontal vibration amplitude of the upper rack and the horizontal vibration amplitude of the lower rack in the initial vibration swing data, that is, the horizontal vibration amplitude of the upper rack and the horizontal vibration amplitude of the lower rack during the first speed increase test after the maintenance of the current pumped energy storage motor, the horizontal vibration amplitude of the upper rack can be compared with the horizontal vibration amplitude of the lower rack, and the type of the to-be-adjusted rack can be determined according to a larger value of the two amplitudes. When the type of the to-be-adjusted rack is an adjustment type of an upper rack, the initial test weight mass of the upper rack is determined according to a ratio of the horizontal vibration amplitude of the upper rack in the initial vibration swing data to an upper counterweight influence coefficient in the counterweight influence coefficient library. When the type of the to-be-adjusted rack is an adjustment type of a lower rack, the initial test weight mass of the lower rack is determined according to a ratio of the horizontal vibration amplitude of the lower rack in the initial vibration swing data to a lower counterweight influence coefficient in the counterweight influence coefficient library.

For example, if the horizontal vibration amplitude of the upper rack is greater than the horizontal vibration amplitude of the lower rack, the type of the to-be-adjusted rack is determined as the adjustment type of the upper rack, and if the horizontal vibration amplitude of the lower rack is greater than the horizontal vibration amplitude of the upper rack, the type of the to-be-adjusted rack is determined as the adjustment type of the lower rack.

In an optional embodiment of the present application, triggering the speed increase test according to the initial test weight mass and the initial test weight phase may include: triggering the speed increase test according to the initial test weight mass, the initial test weight phase and a test weight position set.

The test weight position set may be a position set of the test weight block installed at the current pumped energy storage motor. The test weight position set may include a set of a counterweight position of a magnetic pole, a counterweight position of a rotor support arm and a counterweight position of a coupling bolt.

In the embodiment of the present application, after the initial test weight mass and the initial test weight phase are obtained, the test weight position set of the current pumped energy storage motor can be acquired, a specific installation position of the test weight block with the initial test weight mass can be determined according to the test weight position set and the initial test weight phase of the current pumped energy storage motor, and after the installation of the test weight block with the initial test weight mass at the current pumped energy storage motor according to the above installation position is determined, the speed increase test can be triggered.

For example, a counterweight position of the magnetic pole includes an inside of an assembly T-tail slot of the magnetic yoke and the magnetic pole (belonging to an upper counterweight) and an inside of a magnetic yoke dovetail slot corresponding to the rotor support arm (belonging to a lower counterweight). A counterweight position of the rotor support arm includes an upper end of the rotor support arm (belonging to an upper counterweight) and a lower end of the rotor support arm (belonging to a lower counterweight). A counterweight position of the coupling bolt includes a bolt connecting a rotor to an upper shaft (belonging to an upper counterweight) and a bolt connecting a rotor to a lower shaft (belonging to a lower counterweight).

In S230, a target configuration influence coefficient is determined according to the initial vibration vector, the target vibration vector and the initial test weight mass.

In an optional embodiment of the present application, determining the target configuration influence coefficient according to the initial vibration vector, the target vibration vector and the initial test weight mass may include: calculating a target vector difference according to the target vibration vector and the initial vibration vector; and determining the target configuration influence coefficient according to the target vector difference and the initial test weight mass.

The target vector difference may be a vector difference between the target vibration vector and the initial vibration vector.

In the embodiment of the present application, the difference between the target vibration vector and the initial vibration vector can be calculated and used as the target vector difference (the influence value of the added test weight block with the initial test weight mass on the vibration vector), and the ratio of the target vector difference to the initial test weight mass can be used as the target configuration influence coefficient.

In S240, a target test weight mass and a target test weight phase are determined according to the target configuration influence coefficient and the initial vibration vector, and a residual vibration swing value is calculated according to the target configuration influence coefficient, the initial vibration vector, the target test weight mass and the target test weight phase.

In an optional embodiment of the present application, determining the target test weight mass and the target test weight phase according to the target configuration influence coefficient and the initial vibration vector may include: determining a to-be-evaluated counterweight scheme according to the target configuration influence coefficient and the initial vibration vector; calculating to-be-compared vibration swing data of the to-be-evaluated counterweight scheme; and determining the target test weight mass and the target test weight phase according to the to-be-evaluated counterweight scheme, the to-be-compared vibration swing data and the initial vibration vector.

The to-be-evaluated counterweight scheme may be a counterweight scheme determined according to the target configuration influence coefficient and the initial vibration vector. The to-be-evaluated counterweight scheme may include a counterweight mass and a counterweight phase configured for each test point. The to-be-compared vibration swing data may be vibration swing data acquired when counterweight is performed according to the to-be-evaluated counterweight scheme and the speed increase test is performed.

In the embodiment of the present application, the counterweight mass and the counterweight phase of each test point can be determined according to a ratio of the initial vibration vector to the target configuration influence coefficient to obtain the to-be-evaluated counterweight scheme, vibration swing data of the each test point can be calculated according to the to-be-evaluated counterweight scheme to obtain the to-be-compared vibration swing data, a counterweight scheme with the best vibration swing elimination effect can be screened out from the to-be-evaluated counterweight scheme according to the to-be-compared vibration swing data and the requirement for eliminating the vibration swing, and a counterweight mass and counterweight phase corresponding to the screened counterweight scheme with the best vibration swing elimination effect can be used as the target test weight mass and the target test weight phase, respectively.

In S250, in response to the residual vibration swing value not meeting the rotor operation vibration standard, the target test weight mass and/or the target test weight phase are updated, an operation of calculating the residual vibration swing value is returned to be performed according to the target configuration influence coefficient, the initial vibration vector, the target test weight mass and the target test weight phase until the residual vibration swing value meets the rotor operation vibration standard, and the target test weight adjustment scheme is determined according to the updated target test weight mass and the updated target test weight phase.

In the embodiment of the present application, if the residual vibration swing value does not meet the rotor operation vibration standard, the target test weight mass and/or the target test weight phase are fine-tuned (for example, the target test weight mass and/or the target test weight phase fluctuate up and down by 5%, and specific percentages can be adjusted according to an actual situation), the operation of calculating the residual vibration swing value is returned to be performed according to the target configuration influence coefficient, the initial vibration vector, the target test weight mass and the target test weight phase until the latest calculated residual vibration swing value meets the rotor operation vibration standard, and the target test weight mass and target test weight phase corresponding to the latest calculated residual vibration swing value are used as a final test weight mass and test weight phase to obtain the target test weight adjustment scheme.

In an optional embodiment of the present application, in response to the residual vibration swing value not meeting the rotor operation vibration standard, updating the target test weight mass and/or the target test weight phase may include: calculating a target displacement value matching with a target rotation frequency of the current pumped energy storage motor according to the residual vibration swing value and the target rotation frequency of the current pumped energy storage motor; and in response to the target displacement value being greater than or equal to a target vibration displacement threshold in the rotor operation vibration standard, updating the target test weight mass and/or the target test weight phase.

The target rotation frequency may be a rotation frequency corresponding to the preset speed increase level of the speed increase test. The target displacement value may be a displacement value of the current pumped energy storage motor at the target rotation frequency. The target vibration displacement threshold may be an upper limit value of a displacement of the pumped energy storage motor that meets the rotor operation vibration standard at the target rotation frequency.

In the embodiment of the present application, the target rotation frequency of the current pumped energy storage motor can be determined, a product of a ratio of the residual vibration swing value to the target rotation frequency and a preset coefficient can be used as the target displacement value matching with the target rotation frequency, the target displacement value can be compared with the target vibration displacement threshold in the rotor operation vibration standard, and when the target displacement value is greater than or equal to the target vibration displacement threshold in the rotor operation vibration standard, the target test weight mass and/or the target test weight phase can be updated.

In the technical solution of the embodiment of the present application, the counterweight influence coefficient library, the initial vibration swing data during the first speed increase test after the maintenance of the current pumped energy storage motor and the initial vibration vector during the first speed increase test after the maintenance of the current pumped energy storage motor are acquired; the initial test weight mass and the initial test weight phase are determined according to the initial vibration swing data and the counterweight influence coefficient library, and the speed increase test is triggered according to the initial test weight mass and the initial test weight phase to obtain the target vibration vector; the residual vibration swing value is calculated; in response to the residual vibration swing value not meeting the rotor operation vibration standard, the target test weight mass and/or the target test weight phase are updated, the operation of calculating the residual vibration swing value is returned to be performed according to the target configuration influence coefficient, the initial vibration vector, the target test weight mass and the target test weight phase until the residual vibration swing value meets the rotor operation vibration standard, and the target test weight adjustment scheme is determined according to the updated target test weight mass and the updated target test weight phase. The counterweight influence coefficient library in this solution can fully reflect a counterweight influence situation of the current pumped energy storage motor in historical speed increase tests. According to the counterweight influence coefficient library, the guidance of the historical speed increase tests to the subsequent dynamic-balance test can be implemented, and historical test data can be effectively used. Moreover, this solution does not need manual data calculation, thereby avoiding an error caused by the manual calculation. Through the test method of this solution, a test process can be standardized, and a final test weight scheme is not determined through a complex calculation process with vector graphics, thereby improving test efficiency, solving the problems of low test efficiency, a calculation error in manual calculation and insufficient use of historical test data existing in a dynamic-balance test for a rigid rotor in the related art, improving the test efficiency, avoiding the error caused by the manual calculation and fully using the historical test data to guide the test.

Embodiment Three

Figure 3:
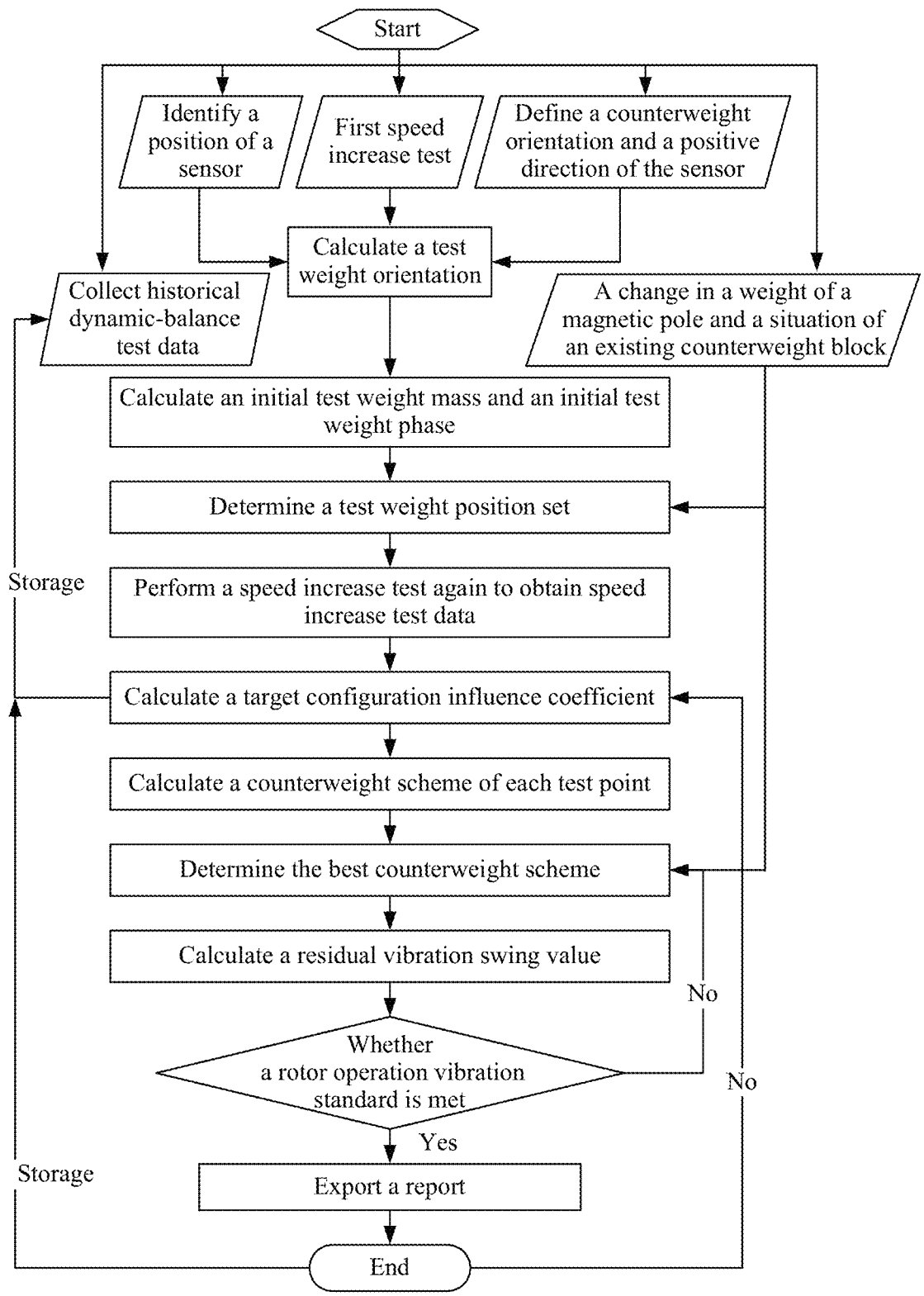
FIG. 3 is a schematic diagram of a dynamic-balance test process of a pumped energy storage motor according to embodiment three of the present application.

FIG. 3 is a schematic diagram of a dynamic-balance test process of a pumped energy storage motor according to embodiment three of the present application. As shown in FIG. 3, for specific steps of the dynamic-balance test of the pumped energy storage motor, reference may be made to the embodiment described below. Terms identical to or similar to the preceding embodiments are not repeated here.

In step 1, A1: data in historical dynamic-balance tests of the current pumped energy storage motor is collected; A2: a position of a sensor is identified; A3: a counterweight orientation and a positive direction of the sensor are defined; A4: a change in a weight of a magnetic pole and a situation of an existing counterweight block; A5: a first speed increase test (a rotational speed of a unit is changed to 25%, 50%, 75% and 100% of a rated rotational speed in sequence) after maintenance is performed to obtain first speed increase test data. In step 2, a test weight orientation is calculated. In step 3, an initial test weight mass and an initial test weight phase are calculated. In step 4, a test weight position set (a set of a counterweight position of a magnetic pole, a counterweight position of a support arm and a counterweight position of a coupling bolt) is determined. In step 5, a speed increase test is performed again after a counterweight to obtain speed increase test data. In step 6, a target configuration influence coefficient is calculated. In step 7, a counterweight scheme (a to-be-evaluated counterweight scheme) of each test point is calculated. In step 8, a counterweight scheme with the best vibration swing elimination effect is determined. In step 9, a residual vibration swing value is calculated. In step 10, the residual vibration swing value meets a rotor operation vibration standard to obtain a target test weight adjustment scheme.

Optionally, A1 may include: collecting initial vibration swing data of the current pumped energy storage motor after the maintenance and influence coefficients $k_s$ and $k_x$ of upper and lower counterweights in the historical dynamic-balance tests of the current pumped energy storage motor to form a counterweight influence coefficient library, where s and x are the numbers of times of historical counterweight, and s, x=1, 2, 3, . . . , n.

Figure 4:
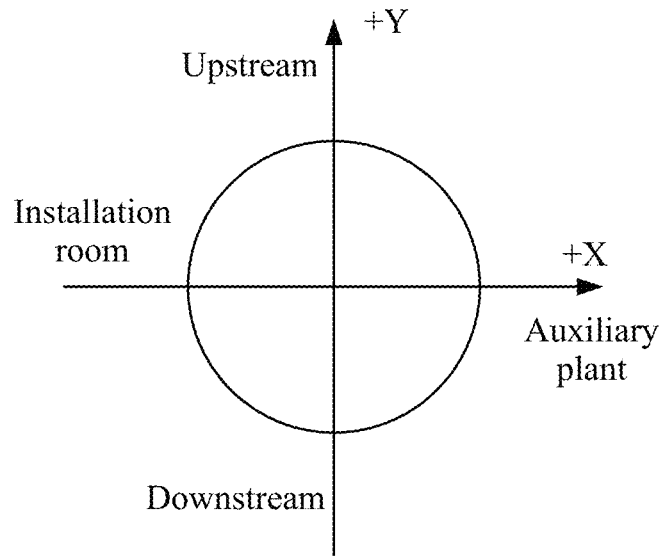
FIG. 4 is a schematic diagram illustrating definition results of identifying a position of a sensor according to embodiment three of the present application.

Optionally, A2 may include: identifying the position of the vibration swing sensor of the current pumped energy storage motor. A +Y direction is generally defined as an upstream direction, a downstream direction opposite to the +Y direction is defined as a −Y direction, a +X direction is defined as an auxiliary plant direction, and an installation room direction opposite to the +X direction is defined as a −X direction. For definition results of identifying the position of the sensor, reference may be made to FIG. 4.

The counterweight orientation and the positive direction of the sensor need to be predefined before the speed increase test. The counterweight orientation directly determines a counterweight force couple direction. The dynamic-balance test process can get an effect instantly through the selection of an appropriate counterweight orientation. A phase angle of vibration and swing is closely related to the counterweight orientation. The phase angle is an angle between a key phase signal pulse and a first positive peak of subsequent vibration and swing. For the swing, a direction approaching a probe of a swing sensor is a positive direction, and a position where a positive peak value is the largest is a position where a main shaft is closest to the sensor, that is, a large shaft is closest to the swing sensor. For the vibration, a direction facing away from a measurement plane of a vibration sensor is a positive direction, and a position where a positive peak value is the largest is a position where a main shaft is closest to a bearing shell corresponding to the measurement plane of the vibration sensor. The bearing shell is subjected to the largest force, resulting in the largest vibration of a rack in the direction.

After it is confirmed that the vibration fault is caused by imbalance, the orientation of the maximum value of the positive peak of vibration and swing is the overweight orientation that causes the large shaft to deviate from the balance position during operation. Confirming the orientation of the maximum value of the positive peak of vibration and swing data, the overweight position of the rotor can be determined.

However, when the phase angle is calculated, attention should be paid to an included angle θ between a key phase sensor and a vibration measurement sensor of the unit. When the phase is calculated, θ should be added, and an actual phase should be φ+θ.

Optionally, A4 may include: recording the change in the weight of the magnetic pole and the situation of the existing counterweight block. For example, if the magnetic pole is replaced during this maintenance and the weight of the magnetic pole changes, a vector generated due to a mass deviation after the replacement of the magnetic pole needs to be calculated according to the distribution of the replaced magnetic pole and the mass difference caused by the replacement of the magnetic pole to synthesize an overweight mass $m_{in\_advance}$ with a phase angle $\theta_{in\_advance}$. According to experience, if $m_{in\_advance} \geq 15$ kg, a precounterweight is generally needed to ensure that the dynamic-balance test of the unit can smoothly increase to the rated rotational speed, and a precounterweight is needed on an opposite side to eliminate the effect caused by the mass deviation after the replacement of the magnetic pole. During this period, a mass $m_{i-counterweight}$ of the existing counterweight block is recorded to form a mass library of the existing counterweight block, where i=1, 2, 3, . . . , n.

Optionally, A5 may include: performing the first speed increase test (changing the rotational speed of the unit to 25%, 50%, 75% and 100% of the rated rotational speed in sequence), recording vibration swing data of the first rotation of the unit after the maintenance to obtain the initial vibration swing data, and recording a 1X rotation frequency amplitude and a 1X phase of each test point to obtain an initial vibration vector $S_0$ before test weight.

Step 2 may include: calculating the test weight orientation according to the initial vibration swing data of each test point obtained after the first speed increase test in A5. The main reference data is the horizontal vibration 1X rotation frequency phase of the X and Y directions of the upper and lower racks, and the swing of the X and Y directions of the upper and lower guides is considered. The test weight orientations $\alpha_1$, $\alpha_2$, $\alpha_3$ and $\alpha_4$ are calculated according to the horizontal vibration 1X rotation frequency phase of the upper and lower racks, and the test weight orientations $\beta_1$, $\beta_2$, $\beta_3$ and $\beta_4$ are calculated through the comprehensive consideration of the swing 1X rotation frequency phase of the upper and lower guides.

Step 3 may include: if the current pumped energy storage motor has been subjected to a dynamic-balance test in the past, selecting an upper counterweight influence coefficient $k_s$ and a lower counterweight influence coefficient $k_x$ from the counterweight influence coefficient library of the current pumped energy storage motor to calculate the initial test weight mass.

If a horizontal vibration 1X amplitude $M_{upper}$ of the upper rack is greater than a horizontal vibration 1X amplitude $M_{lower}$ of the lower rack, counterweighting an upper portion is considered. The initial test weight mass $W_{upper}$ of the upper rack is as follows:

$$W_{upper} = \frac{|M_{upper}|}{k_s}$$

where $W_{upper}$ denotes a mass of an upper test weight with a unit of kg, $M_{upper}$ denotes the horizontal vibration 1X rotation frequency amplitude of the upper rack, and $k_s$ denotes the upper counterweight influence coefficient.

If the horizontal vibration 1X amplitude $M_{lower}$ of the lower rack is greater than the horizontal vibration 1X amplitude $M_{upper}$ of the upper rack, counterweighting a lower portion is considered. The initial test weight mass $W_{lower}$ of the lower rack is as follows:

$$W_{lower} = \frac{|M_{lower}|}{k_x}$$

where $W_{lower}$ denotes a mass of a lower test weight with a unit of kg, $M_{lower}$ denotes the horizontal vibration 1X rotation frequency amplitude of the lower rack, and $k_x$ denotes the lower counterweight influence coefficient.

In step 2, the counterweight orientations $\alpha_1$, $\alpha_2$, $\alpha_3$, $\alpha_4$, $\beta_1$, $\beta_2$, $\beta_3$ and $\beta_4$ of each test point have been calculated. Generally, (1) a value of or is close to that of $\alpha_2$, a value of $\alpha_3$ is close to that of $\alpha_4$, a value of $\beta_1$ is close to that of $\beta_2$, and a value of $\beta_3$ is close to that of $\beta_4$; (2) a difference between reading of $\alpha_1$ and reading of $\beta_1$ is less than 15°, a difference between reading of $\alpha_2$ and reading of $\beta_2$ is less than 15°, a difference between reading of $\alpha_3$ and reading of $\beta_3$ is less than 15°, and a difference between reading of $\alpha_4$ and reading of $\beta_4$ is less than 15°. Generally, the elimination of the horizontal vibration 1X rotation frequency amplitudes of the upper and lower racks is preferentially considered. Therefore, the test weight phase should be selected from $\alpha_1$, $\alpha_2$, $\alpha_3$ and $\alpha_4$. If $M_{upper}$ is more than twice as large as $M_{lower}$, selecting the test weight phase from $\alpha_1$ and $\alpha_2$ is considered, and if $M_{lower}$ is more than twice as large as $M_{upper}$, selecting the test weight phase from $\alpha_3$ and $\alpha_4$ is considered.

Step 5 may include: installing the counterweight block and performing the speed increase test (changing the rotational speed of the unit to 25%, 50%, 75% and 100% of the rated rotational speed in sequence) after the test weight according to the initial vibration vector $S_0$ obtained in A5 of step 1, the initial test weight mass and the initial test weight phase obtained in step 3 and the installation position of the counterweight block matched with the unit to obtain a target vibration vector $S_1$ of dynamic-balance test data after the test weight.

Step 6 may include: calculating the target configuration influence coefficient F according to the following formula:

$$F = \frac{S_1 - S_0}{W_p}$$

where $S_1$ denotes the target vibration vector, $S_0$ denotes the initial vibration vector, and $W_p$ denotes the initial test weight mass.

After the target configuration influence coefficient is obtained, the target configuration influence coefficient can be stored as a part of the historical dynamic-balance test data.

Step 7 may include: calculating the counterweight scheme of each test point according to the target configuration influence coefficient F obtained in step 6.

According to the equilibrium equation $$FW_q + S_0 = 0, \ W_q = \frac{-S_0 W_p}{S_1 - S_0}$$

is obtained;
where F denotes the target configuration influence coefficient, $S_0$ denotes the initial vibration vector, and $W_q$ denotes a correction counterweight of the test point with a unit of kg.

$|W_q|$ is a magnitude of the correction counterweight of the test point, and a phase of a vector of $W_q$ is an angular position of a counterweight block added to a correction plane.

Step 8 may include: separately calculating counterweight schemes of the test points corresponding to the swing of the X direction of the upper guide, the swing of the Y direction of the upper guide, the swing of the X direction of the lower guide, the swing of the Y direction of the lower guide, the horizontal vibration of the X direction of the upper rack, the horizontal vibration of the Y direction of the upper rack, the horizontal vibration of the X direction of the lower rack and the horizontal vibration of the Y direction of the lower rack, weighing the counterweight scheme among the to-be-evaluated counterweight scheme, and prioritizing the elimination of the horizontal vibration 1X rotation frequency amplitudes of the upper and lower racks to obtain the counterweight scheme with the best vibration swing elimination effect.

Step 9 may include: calculating the residual vibration swing value according to the final confirmed counterweight scheme:

$$S_c = FW_c + S_0$$

where $S_c$ denotes the residual vibration swing value, $S_0$ denotes the initial vibration vector, F denotes the target configuration influence coefficient, $W_c$ denotes a counterweight vector of the counterweight scheme with the best vibration swing elimination effect, and the counterweight vector includes a target test weight mass and a target test weight phase.

According to the counterweight scheme with the best vibration swing elimination effect, the effect of each counterweight scheme on each test point is calculated, and the residual vibration vectors of each test point, including the swing of the X direction of the upper guide, the swing of the Y direction of the upper guide, the swing of the X direction of the lower guide, the swing of the Y direction of the lower guide, the horizontal vibration of the X direction of the upper rack, the horizontal vibration of the Y direction of the upper rack, the horizontal vibration of the X direction of the lower rack and the horizontal vibration of the Y direction of the lower rack, can be reversely calculated in sequence, that is, the to-be-compared vibration swing data of each test point after the counterweight is predicted.

Step 10 may include: after repeated calculations and tests in steps 7 to 9, adjusting the counterweight mass and the counterweight orientation, and performing a speed increase test (changing the rotational speed of the unit to 25%, 50%, 75% and 100% of the rated rotational speed in sequence) again so that displacement values A corresponding to the horizontal vibration 1X rotation frequency components of the upper and lower racks meet a target vibration displacement threshold (above 375 r/min: 50 um; below 375 r/min: 70 um) in clause 9.1.3.9 of GB/T18482-2010 "Specification for start-up test of reversible pumped-storage units". Generally, effective values of the horizontal vibration of the upper and lower racks measured by an online monitoring apparatus of the pumped energy storage motor need to be converted. The conversion formula is as follows:

$$A = \frac{\sqrt{2}V}{\pi f}$$

where A denotes a target displacement value matching with a target rotation frequency, V denotes an effective displacement value (a value of $S_c$ can be substituted into the formula for calculating the target displacement value as V), f denotes the target rotation frequency, and π denotes Pi.

When the target displacement value matching with the target rotation frequency is less than an allowable vibration value of the unit at the rated rotational speed, the speed increase test is performed according to the test weight mass and the test weight phase of the target test weight adjustment scheme, and whether the current pumped energy storage motor after being counterweighted meets the rotor operation vibration standard is determined. If the current pumped energy storage motor after being counterweighted meets the rotor operation vibration standard, a report is formed by the test weight mass and the test weight phase of the target test weight adjustment scheme and exported, and the report is subjected to data storage as a part of the historical dynamic-balance test data. If the current pumped energy storage motor after being counterweighted does not meet the rotor operation vibration standard, the operation of determining the best counterweight scheme is returned. After the report is exported, whether the test data of the current pumped energy storage motor after being counterweighted meets an expectation can also be determined. If the test data of the current pumped energy storage motor after being counterweighted meets the expectation, the test data is exported. Otherwise, the target configuration influence coefficient is updated and calculated.

In this solution, through the influence coefficient method, the counterweight scheme is calculated, the parameters of the test-related sensors are provided with standardized definitions, the relevant parameters for the dynamic-balance test of the unit are standardized, and standardized operations such as storage can be performed on the data. The historical test data is fully used, and the efficiency of the dynamic-balance test is improved. Moreover, the dynamic-balance test is standardized and digitalized, the accuracy and reliability of the test are improved, and standardized management is performed on the process of the dynamic-balance test, thereby reducing the difficulty of implementing the on-site dynamic-balance test. The testing personnel can quickly master the dynamic-balance test method, thereby having the ability to independently perform the test.

Embodiment Four

Figure 5:
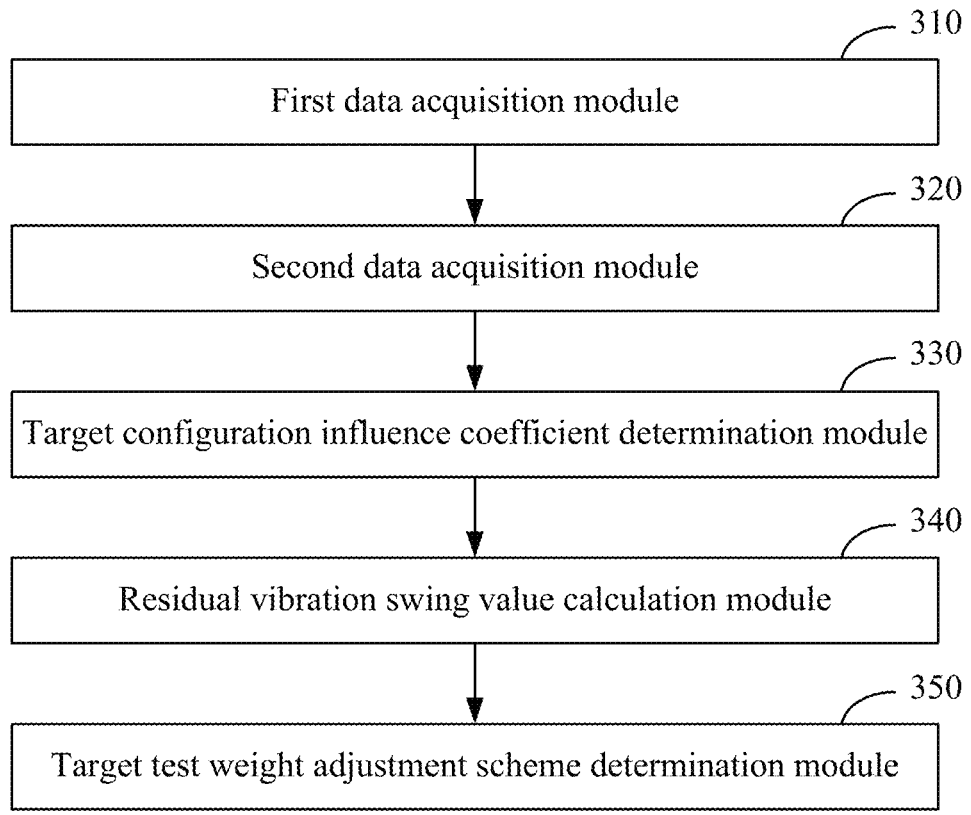
FIG. 5 is a structure diagram of a dynamic-balance test apparatus for a rigid rotor according to embodiment four of the present application.

FIG. 5 is a structure diagram of a dynamic-balance test apparatus for a rigid rotor according to embodiment four of the present application. As shown in FIG. 5, the apparatus includes a first data acquisition module 310, a second data acquisition module 320, a target configuration influence coefficient determination module 330, a residual vibration swing value calculation module 340 and a target test weight adjustment scheme determination module 350.

The first data acquisition module 310 is configured to acquire a counterweight influence coefficient library, initial vibration swing data during a first speed increase test after maintenance of a current pumped energy storage motor and an initial vibration vector during the first speed increase test after the maintenance of the current pumped energy storage motor.

The second data acquisition module 320 is configured to determine an initial test weight mass and an initial test weight phase according to the initial vibration swing data and the counterweight influence coefficient library and trigger a speed increase test according to the initial test weight mass and the initial test weight phase to obtain a target vibration vector.

The target configuration influence coefficient determination module 330 is configured to determine a target configuration influence coefficient according to the initial vibration vector, the target vibration vector and the initial test weight mass.

The residual vibration swing value calculation module 340 is configured to determine a target test weight mass and a target test weight phase according to the target configuration influence coefficient and the initial vibration vector and calculate a residual vibration swing value according to the target configuration influence coefficient, the initial vibration vector, the target test weight mass and the target test weight phase.

The target test weight adjustment scheme determination module 350 is configured to determine a target test weight adjustment scheme according to the residual vibration swing value, a rotor operation vibration standard, the target test weight mass and the target test weight phase.

In the technical solution of the embodiment of the present application, the counterweight influence coefficient library, the initial vibration swing data of the first speed increase test performed after the current pumped energy storage motor is maintained and the initial vibration vector of the first speed increase test performed after the current pumped energy storage motor is maintained are acquired; the initial test weight mass and the initial test weight phase are determined according to the initial vibration swing data and the counterweight influence coefficient library, and the speed increase test is triggered according to the initial test weight mass and the initial test weight phase to obtain the target vibration vector; the target configuration influence coefficient is determined according to the initial vibration vector, the target vibration vector and the initial test weight mass; the target test weight mass and the target test weight phase are determined according to the target configuration influence coefficient, the initial vibration vector and the initial test weight mass, and the residual vibration swing value is calculated according to the target configuration influence coefficient, the initial vibration vector, the target test weight mass and the target test weight phase; the target test weight adjustment scheme is determined according to the residual vibration swing value, the rotor operation vibration standard, the target test weight mass and the target test weight phase. The counterweight influence coefficient library in this solution can fully reflect a counterweight influence situation of the current pumped energy storage motor in historical speed increase tests. According to the counterweight influence coefficient library, the guidance of the historical speed increase tests to the subsequent dynamic-balance test can be implemented, and historical test data can be effectively used. Moreover, this solution does not need manual data calculation, thereby avoiding an error caused by the manual calculation. Through the test method of this solution, a test process can be standardized, and a final test weight scheme is not determined through a complex calculation process with vector graphics, thereby improving test efficiency, solving the problems of low test efficiency, a calculation error in manual calculation and insufficient use of historical test data existing in a dynamic-balance test for a rigid rotor in the related art, improving the test efficiency, avoiding the error caused by the manual calculation and fully using the historical test data to guide the test.

Optionally, the second data acquisition module 320 includes an initial test weight mass determination unit configured to perform the operations described below. A type of a to-be-adjusted rack is determined according to the initial vibration swing data. In response to the type of the to-be-adjusted rack being an adjustment type of an upper rack, an initial test weight mass of the upper rack is determined according to a horizontal vibration amplitude of the upper rack in the initial vibration swing data and the counterweight influence coefficient library. In response to the type of the to-be-adjusted rack being an adjustment type of a lower rack, an initial test weight mass of the lower rack is determined according to a horizontal vibration amplitude of the lower rack in the initial vibration swing data and the counterweight influence coefficient library.

Optionally, the target configuration influence coefficient determination module 330 is configured to calculate a target vector difference according to the target vibration vector and the initial vibration vector and determine the target configuration influence coefficient according to the target vector difference and the initial test weight mass.

Optionally, the target test weight adjustment scheme determination module 350 is configured to perform the operations described below. In response to the residual vibration swing value not meeting the rotor operation vibration standard, the target test weight mass and/or the target test weight phase are updated, an operation of calculating the residual vibration swing value is returned to be performed according to the target configuration influence coefficient, the initial vibration vector, the target test weight mass and the target test weight phase until the residual vibration swing value meets the rotor operation vibration standard, and the target test weight adjustment scheme is determined according to the updated target test weight mass and the updated target test weight phase.

Optionally, the residual vibration swing value calculation module 340 further includes a test weight mass and test weight phase determination unit configured to determine a to-be-evaluated counterweight scheme according to the target configuration influence coefficient and the initial vibration vector, calculate to-be-compared vibration swing data of the to-be-evaluated counterweight scheme and determine the target test weight mass and the target test weight phase according to the to-be-evaluated counterweight scheme, the to-be-compared vibration swing data and the initial vibration vector.

Optionally, the target test weight adjustment scheme determination module 350 includes a test weight scheme update unit configured to perform the operations described below. A target displacement value matching with a target rotation frequency of the current pumped energy storage motor is calculated according to the residual vibration swing value and the target rotation frequency of the current pumped energy storage motor. In response to the target displacement value being greater than or equal to a target vibration displacement threshold in the rotor operation vibration standard, the target test weight mass and/or the target test weight phase are updated.

Optionally, the second data acquisition module 320 further includes a speed increase test triggering unit configured to trigger the speed increase test according to the initial test weight mass, the initial test weight phase and a test weight position set, where the test weight position set includes a set of a counterweight position of a magnetic pole, a counterweight position of a rotor support arm and a counterweight position of a coupling bolt.

The dynamic-balance test apparatus for a rigid rotor provided in this embodiment of the present application can perform the dynamic-balance test method for a rigid rotor provided in any one of embodiments of the present application and has function modules and beneficial effects corresponding to the performed method.

Embodiment Five

Figure 6:
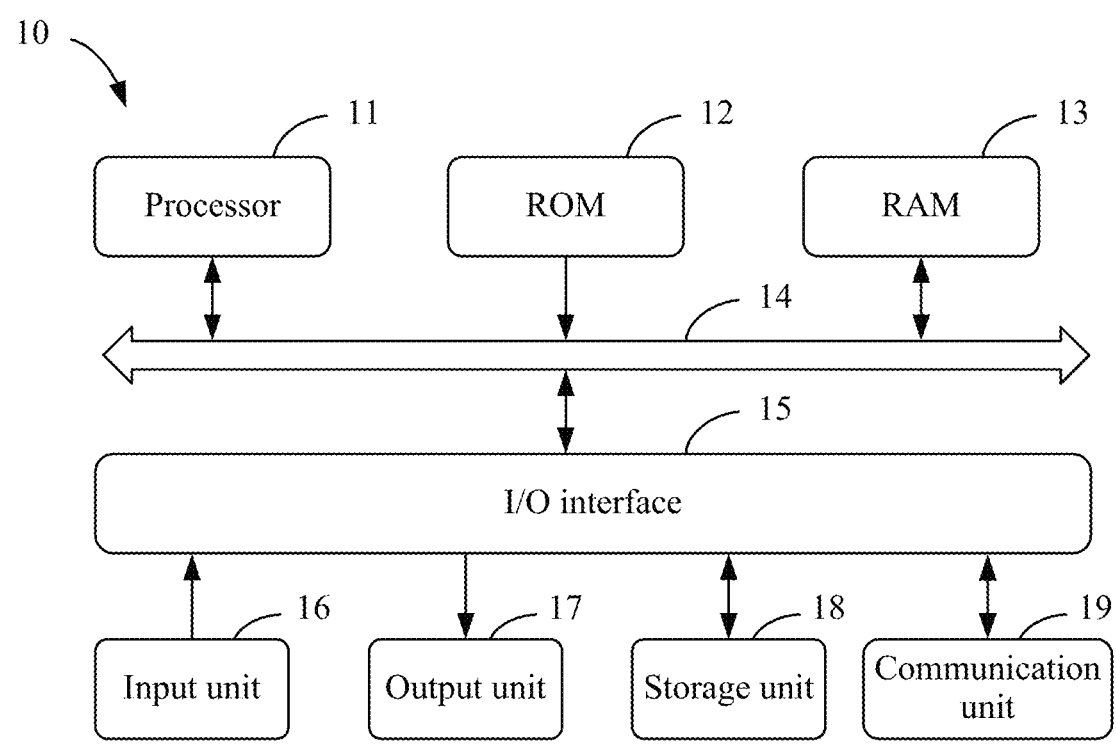
FIG. 6 is a structure diagram of an electronic device that can implement an embodiment of the present application.

FIG. 6 is a diagram illustrating the structure of an electronic device for implementing embodiments of the present application. The electronic device is intended to represent various forms of digital computers, for example, a laptop computer, a desktop computer, a worktable, a personal digital assistant, a server, a blade server, a mainframe computer, and an applicable computer. The electronic device may also represent various forms of mobile apparatuses, for example, a personal digital assistant, a cellphone, a smartphone, a wearable device (such as a helmet, glasses, or a watch), and a similar computing apparatus. Herein the shown components, the connections and relationships between these components, and the functions of these components are illustrative only.

As shown in FIG. 6, the electronic device 10 includes at least one processor 11 and a memory communicatively connected to the at least one processor 11, such as a read-only memory (ROM) 12 and a random-access memory (RAM) 13. The memory stores a computer program executable by the at least one processor. The processor 11 can perform various appropriate actions and processing according to a computer program stored in the ROM 12 or a computer program loaded into the RAM 13 from a storage unit 18. Various programs and data required for the operation of the electronic device 10 may also be stored in the RAM 13. The processor 11, the ROM 12, and the RAM 13 are connected to each other through a bus 14. An input/output (I/O)) interface 15 is also connected to the bus 14.

Multiple components in the electronic device 10 are connected to the I/O interface 15. The multiple components include an input unit 16 such as a keyboard or a mouse, an output unit 17 such as various types of display or speaker, the storage unit 18 such as a magnetic disk or an optical disk, and a communication unit 19 such as a network card, a modem, or a wireless communication transceiver. The communication unit 19 allows the electronic device 10 to exchange information/data with other devices over a computer network such as the Internet and/or various telecommunications networks.

The processor 11 may be various general-purpose and/or special-purpose processing components having processing and computing capabilities. Examples of the processor 11 include a central processing unit (CPU), a graphics processing unit (GPU), a special-purpose artificial intelligence (AI) computing chip, a processor executing machine learning models and algorithms, a digital signal processor (DSP), and any appropriate processor, controller and microcontroller. The processor 11 performs the preceding methods and processing, such as a dynamic-balance test method for a rigid rotor.

In some examples, the dynamic-balance test method for a rigid rotor may be implemented as computer programs tangibly contained in a computer-readable storage medium such as the storage unit 18. In some embodiments, part or all of computer programs may be loaded and/or installed onto the electronic device 10 via the ROM 12 and/or the communication unit 19. When the computer programs are loaded to the RAM 13 and executed by the processor 11, one or more steps of the preceding dynamic-balance test method for a rigid rotor may be performed. Alternatively, in other embodiments, the processor 11 may be configured, in any other suitable manner (for example, by means of firmware), to perform the dynamic-balance test method for a rigid rotor.

The various embodiments of the systems and techniques described herein may be implemented in digital electronic circuitry, integrated circuitry, a field-programmable gate array (FPGA), an application-specific integrated circuit (ASIC), application specific standard parts (ASSP), a system on a chip (SoC), a complex programmable logic device (CPLD), computer hardware, firmware, software and/or a combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Computer programs for implementation of the methods of the present application may be written in one programming language or any combination of multiple programming languages. These computer programs may be provided for a processor of a general-purpose computer, a special-purpose computer or another programmable data processing apparatus to enable functions/operations specified in a flowchart and/or a block diagram to be implemented when the computer programs are executed by the processor. The computer programs may be executed entirely on a machine, partly on a machine, as a stand-alone software package, partly on a machine and partly on a remote machine, or entirely on a remote machine or a server.

In the context of the present application, the computer-readable storage medium may be a tangible medium that may include or store a computer program for use by or in connection with an instruction execution system, apparatus or device. The computer-readable storage medium may include an electronic, magnetic, optical, electromagnetic, infrared, or semiconductor system, apparatus, or device or any appropriate combination thereof. Alternatively, the computer-readable storage medium may be a machine-readable signal medium. The machine-readable storage medium may include an electrical connection based on one or more wires, a portable computer disk, a hard disk, an RAM, an ROM, an erasable programmable read-only memory (EPROM), a flash memory, an optical fiber, a portable compact disk read-only memory (CD-ROM), an optical memory device, a magnetic memory device, or any suitable combination thereof.

In order that interaction with a user is provided, the systems and techniques described herein may be implemented in the electronic device. The electronic device has a display apparatus (for example, a cathode-ray tube (CRT) or a liquid-crystal display (LCD) monitor) for displaying information to the user; and a keyboard and a pointing apparatus (for example, a mouse or a trackball) through which the user can provide input for the electronic device. Other types of apparatuses may also be used for providing interaction with the user. For example, feedback provided for the user may be sensory feedback in any form (for example, visual feedback, auditory feedback, or tactile feedback); and input from the user may be received in any form (including acoustic input, voice input, or tactile input).

The systems and techniques described herein may be implemented in a computing system including a back-end component (for example, a data server), a computing system including a middleware component (for example, an application server), a computing system including a front-end component (for example, a user computer having a graphical user interface or a web browser through which the user can interact with embodiments of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in conventional physical host and virtual private server (VPS) services.

What is claimed is:

1. A dynamic-balance test method for a rigid rotor, comprising:

acquiring a counterweight influence coefficient library, initial vibration swing data collected by a vibration sensor and a swing sensor during a first speed increase test after maintenance of a current pumped energy storage motor and an initial vibration vector during the first speed increase test after the maintenance of the current pumped energy storage motor;

determining an initial test weight mass and an initial test weight phase according to the initial vibration swing data and the counterweight influence coefficient library, and triggering the current pumped energy storage motor to perform a speed increase test according to the initial test weight mass and the initial test weight phase to obtain a target vibration vector;

determining a target configuration influence coefficient according to the initial vibration vector, the target vibration vector and the initial test weight mass;

determining a target test weight mass and a target test weight phase of a counterweight block installed at a selected test point according to the target configuration influence coefficient and the initial vibration vector, wherein the selected test point comprises one of an upper guide, a lower guide, an upper rack or a lower rack, and calculating a residual vibration swing value according to the target configuration influence coefficient, the initial vibration vector, the target test weight mass and the target test weight phase of the counterweight block installed at the selected test point; and determining a target test weight adjustment scheme according to the residual vibration swing value, a rotor operation vibration standard, the target test weight mass and the target test weight phase of the counterweight block installed at the selected test point;

wherein determining the target test weight mass and the target test weight phase of the counterweight block installed at the selected test point according to the target configuration influence coefficient and the initial vibration vector comprises:

determining a to-be-evaluated counterweight scheme according to the target configuration influence coefficient and the initial vibration vector;

calculating to-be-compared vibration swing data of the to-be-evaluated counterweight scheme; and determining the target test weight mass and the target test weight phase of the counterweight block installed at the selected test point according to the to-be-evaluated counterweight scheme, the to-be-compared vibration swing data and the initial vibration vector;

wherein determining the target test weight adjustment scheme according to the residual vibration swing value, the rotor operation vibration standard, the target test weight mass and the target test weight phase of the counterweight block installed at the selected test point comprises:

in response to the residual vibration swing value not meeting the rotor operation vibration standard, updating the target test weight mass and/or the target test weight phase, returning to perform an operation of calculating the residual vibration swing value according to the target configuration influence coefficient, the initial vibration vector, the target test weight mass and the target test weight phase until the residual vibration swing value meets the rotor operation vibration standard, and determining the target test weight adjustment scheme according to the updated target test weight mass and the updated target test weight phase;

wherein in response to the residual vibration swing value not meeting the rotor operation vibration standard, updating the target test weight mass and/or the target test weight phase comprises:

calculating a target displacement value matching with a target rotation frequency of the current pumped energy storage motor according to the residual vibration swing value and the target rotation frequency of the current pumped energy storage motor; and in response to the target displacement value being greater than or equal to a target vibration displacement threshold in the rotor operation vibration standard, updating the target test weight mass and/or the target test weight phase.

2. The method according to claim 1, wherein determining the initial test weight mass according to the initial vibration swing data and the counterweight influence coefficient library comprises:

determining a type of a to-be-adjusted rack according to the initial vibration swing data;

in response to the type of the to-be-adjusted rack being an adjustment type of an upper rack, determining an initial test weight mass of the upper rack according to a horizontal vibration amplitude of the upper rack in the initial vibration swing data and the counterweight influence coefficient library; or in response to the type of the to-be-adjusted rack being an adjustment type of a lower rack, determining an initial test weight mass of the lower rack according to a horizontal vibration amplitude of the lower rack in the initial vibration swing data and the counterweight influence coefficient library.

3. The method according to claim 1, wherein determining the target configuration influence coefficient according to the initial vibration vector, the target vibration vector and the initial test weight mass comprises:

calculating a target vector difference according to the target vibration vector and the initial vibration vector; and determining the target configuration influence coefficient according to the target vector difference and the initial test weight mass.

4. The method according to claim 1, wherein triggering the speed increase test according to the initial test weight mass and the initial test weight phase comprises:

triggering the speed increase test according to the initial test weight mass, the initial test weight phase and a test weight position set;
wherein the test weight position set comprises a magnetic pole, a rotor support arm and a coupling bolt.

5. An electronic device, comprising:
at least one processor; and
a memory communicatively connected to the at least one processor;
wherein the memory stores a computer program executable by the at least one processor to enable the at least one processor to perform:
acquiring a counterweight influence coefficient library, initial vibration swing data collected by a vibration sensor and a swing sensor during a first speed increase test after maintenance of a current pumped energy storage motor and an initial vibration vector during the first speed increase test after the maintenance of the current pumped energy storage motor;
determining an initial test weight mass and an initial test weight phase according to the initial vibration swing data and the counterweight influence coefficient library, and triggering the current pumped energy storage motor to perform a speed increase test according to the initial test weight mass and the initial test weight phase to obtain a target vibration vector;
determining a target configuration influence coefficient according to the initial vibration vector, the target vibration vector and the initial test weight mass;
determining a target test weight mass and a target test weight phase of a counterweight block installed at a selected test point according to the target configuration influence coefficient and the initial vibration vector, wherein the selected test point comprises one of an upper guide, a lower guide, an upper rack or a lower rack, and calculating a residual vibration swing value according to the target configuration influence coefficient, the initial vibration vector, the target test weight mass and the target test weight phase of the counterweight block installed at the selected test point; and
determining a target test weight adjustment scheme according to the residual vibration swing value, a rotor operation vibration standard, the target test weight mass and the target test weight phase of the counterweight block installed at the selected test point;
wherein determining the target test weight mass and the target test weight phase of the counterweight block installed at the selected test point according to the target configuration influence coefficient and the initial vibration vector comprises:
determining a to-be-evaluated counterweight scheme according to the target configuration influence coefficient and the initial vibration vector;
calculating to-be-compared vibration swing data of the to-be-evaluated counterweight scheme; and
determining the target test weight mass and the target test weight phase of the counterweight block installed at the selected test point according to the to-be-evaluated counterweight scheme, the to-be-compared vibration swing data and the initial vibration vector;
wherein determining the target test weight adjustment scheme according to the residual vibration swing value, the rotor operation vibration standard, the target test weight mass and the target test weight phase of the counterweight block installed at the selected test point comprises:

in response to the residual vibration swing value not meeting the rotor operation vibration standard, updating the target test weight mass and/or the target test weight phase, returning to perform an operation of calculating the residual vibration swing value according to the target configuration influence coefficient, the initial vibration vector, the target test weight mass and the target test weight phase until the residual vibration swing value meets the rotor operation vibration standard, and determining the target test weight adjustment scheme according to the updated target test weight mass and the updated target test weight phase;
wherein in response to the residual vibration swing value not meeting the rotor operation vibration standard, updating the target test weight mass and/or the target test weight phase comprises:
calculating a target displacement value matching with a target rotation frequency of the current pumped energy storage motor according to the residual vibration swing value and the target rotation frequency of the current pumped energy storage motor; and
in response to the target displacement value being greater than or equal to a target vibration displacement threshold in the rotor operation vibration standard, updating the target test weight mass and/or the target test weight phase.

6. The electronic device according to claim 5, wherein the at least one processor is further configured to:
determine a type of a to-be-adjusted rack according to the initial vibration swing data;
in response to the type of the to-be-adjusted rack being an adjustment type of an upper rack, determine an initial test weight mass of the upper rack according to a horizontal vibration amplitude of the upper rack in the initial vibration swing data and the counterweight influence coefficient library; or
in response to the type of the to-be-adjusted rack being an adjustment type of a lower rack, determine an initial test weight mass of the lower rack according to a horizontal vibration amplitude of the lower rack in the initial vibration swing data and the counterweight influence coefficient library.

7. The electronic device according to claim 5, wherein the at least one processor is further configured to:
calculate a target vector difference according to the target vibration vector and the initial vibration vector; and
determine the target configuration influence coefficient according to the target vector difference and the initial test weight mass.

8. The electronic device according to claim 5, wherein the at least one processor is further configured to:
trigger the speed increase test according to the initial test weight mass, the initial test weight phase and a test weight position set;
wherein the test weight position set comprises a set of a counterweight position of a magnetic pole, a counterweight position of a rotor support arm and a counterweight position of a coupling bolt.

9. A non-transitory computer-readable storage medium storing computer instructions which, when executed by a processor, are configured to perform:
acquiring a counterweight influence coefficient library, initial vibration swing data collected by a vibration sensor and a swing sensor during a first speed increase test after maintenance of a current pumped energy storage motor and an initial vibration vector during the first speed increase test after the maintenance of the current pumped energy storage motor;

determining an initial test weight mass and an initial test weight phase according to the initial vibration swing data and the counterweight influence coefficient library, and triggering the current pumped energy storage motor to perform a speed increase test according to the initial test weight mass and the initial test weight phase to obtain a target vibration vector;

determining a target configuration influence coefficient according to the initial vibration vector, the target vibration vector and the initial test weight mass;

determining a target test weight mass and a target test weight phase of a counterweight block installed at a selected test point according to the target configuration influence coefficient and the initial vibration vector, wherein the selected test point comprises one of an upper guide, a lower guide, an upper rack or a lower rack, and calculating a residual vibration swing value according to the target configuration influence coefficient, the initial vibration vector, the target test weight mass and the target test weight phase of the counterweight block installed at the selected test point; and determining a target test weight adjustment scheme according to the residual vibration swing value, a rotor operation vibration standard, the target test weight mass and the target test weight phase of the counterweight block installed at the selected test point;

wherein determining the target test weight mass and the target test weight phase of the counterweight block installed at the selected test point according to the target configuration influence coefficient and the initial vibration vector comprises:

determining a to-be-evaluated counterweight scheme according to the target configuration influence coefficient and the initial vibration vector;

calculating to-be-compared vibration swing data of the to-be-evaluated counterweight scheme; and determining the target test weight mass and the target test weight phase of the counterweight block installed at the selected test point according to the to-be-evaluated counterweight scheme, the to-be-compared vibration swing data and the initial vibration vector;

wherein determining the target test weight adjustment scheme according to the residual vibration swing value, the rotor operation vibration standard, the target test weight mass and the target test weight phase of the counterweight block installed at the selected test point comprises:

in response to the residual vibration swing value not meeting the rotor operation vibration standard, updating the target test weight mass and/or the target test weight phase, returning to perform an operation of calculating the residual vibration swing value according to the target configuration influence coefficient, the initial vibration vector, the target test weight mass and the target test weight phase until the residual vibration swing value meets the rotor operation vibration standard, and determining the target test weight adjustment scheme according to the updated target test weight mass and the updated target test weight phase;

wherein in response to the residual vibration swing value not meeting the rotor operation vibration standard, updating the target test weight mass and/or the target test weight phase comprises:

calculating a target displacement value matching with a target rotation frequency of the current pumped energy storage motor according to the residual vibration swing value and the target rotation frequency of the current pumped energy storage motor; and in response to the target displacement value being greater than or equal to a target vibration displacement threshold in the rotor operation vibration standard, updating the target test weight mass and/or the target test weight phase.

10. The non-transitory computer-readable storage medium according to claim 9, wherein the processor is further configured to:

determine a type of a to-be-adjusted rack according to the initial vibration swing data;

in response to the type of the to-be-adjusted rack being an adjustment type of an upper rack, determine an initial test weight mass of the upper rack according to a horizontal vibration amplitude of the upper rack in the initial vibration swing data and the counterweight influence coefficient library; or in response to the type of the to-be-adjusted rack being an adjustment type of a lower rack, determine an initial test weight mass of the lower rack according to a horizontal vibration amplitude of the lower rack in the initial vibration swing data and the counterweight influence coefficient library.

11. The non-transitory computer-readable storage medium according to claim 9, wherein the processor is further configured to:

calculate a target vector difference according to the target vibration vector and the initial vibration vector; and determine the target configuration influence coefficient according to the target vector difference and the initial test weight mass.

12. The non-transitory computer-readable storage medium according to claim 9, wherein the processor is further configured to:

trigger the speed increase test according to the initial test weight mass, the initial test weight phase and a test weight position set;

wherein the test weight position set comprises a set of a counterweight position of a magnetic pole, a counterweight position of a rotor support arm and a counterweight position of a coupling bolt.

* * * * *